United States Patent [19]
Ward

[11] Patent Number: 4,470,880
[45] Date of Patent: Sep. 11, 1984

[54] METHOD FOR SEPARATING A LIQUID WASTE FINISH COMPOSITION

[75] Inventor: Charles S. Ward, Columbia, S.C.

[73] Assignee: Allied Corporation, Morris Township, Morris County, N.J.

[21] Appl. No.: 389,839

[22] Filed: Jun. 18, 1982

[51] Int. Cl.³ .............................................. B01D 3/10
[52] U.S. Cl. ......................................... 203/11; 159/3; 159/11.1; 159/47.1; 203/89; 203/91; 203/DIG. 11
[58] Field of Search .................... 159/3, 5, 6 R, 7, 9.1, 159/9.2, 11.1, 11.2, 11.3, 47.1, 47.3, 48.1, 48.2, 49, DIG. 10; 203/11, DIG. 11, 91, 89

[56] References Cited
U.S. PATENT DOCUMENTS 2,623,298 12/1952 Fladmark ........................... 159/11.2
3,296,709 1/1967 Barsch .................................... 34/84
3,787,481 1/1974 Siclari et al. ........................... 23/285
3,870,475 3/1975 Siclari et al. ........................... 23/285

FOREIGN PATENT DOCUMENTS
1019099 2/1966 United Kingdom .

Primary Examiner—Frank Sever

[57] ABSTRACT

A method is provided for separating a liquid mixture into its aqueous and non-aqueous liquid phases. The method comprises the steps of introducing the liquid mixture into a gas-tight vessel; rotating the vessel at a surface speed of approximately 19 to 190 ft/min (0.095 to 0.950 m/s) to cause filming of the liquid composition, while simultaneously heating the vessel to cause the aqueous phase to evaporate; removing the water vapor under vacuum; and condensing the water vapor for removal.

6 Claims, 2 Drawing Figures

METHOD FOR SEPARATING A LIQUID WASTE FINISH COMPOSITION

BACKGROUND OF THE INVENTION

1. Field of the Invention

The present invention relates to the separation of a liquid mixture into its aqueous and non-aqueous liquid phases. More particularly, the invention is related to the separation of the aqueous and non-aqueous phases of a finish composition diluted with water and having a Brookfield viscosity at 25° C. of 2 to 115 centipoise.

2. The Prior Art

In the production of multifilament synthetic polymer yarn, especially polyester and polyamide yarns, it is conventional to coat the solidified filaments with a spin finish or overfinish composition to improve processing of the yarn and ultimate yarn properties. These finish compositions may be applied to the yarn in a variety of ways, for example by contact with a roll rotating in a trough of the composition or with a surface to which the composition is metered. The waste finish composition is diluted with distilled or deionized water for removal from the process equipment and then fed to a collection point for disposal. There may be components of the non-aqueous phase of the waste finish composition which require disposal of the composition in a hazardous waste disposal facility approved by the Environmental Protection Agency. As the water content of the waste finish composition may be quite high, for example as high as 99 percent, it is desirable to develop a method to separate the aqueous and non-aqueous phases for disposal of the non-aqueous phase; transportation and disposal costs necessary for ultimate disposal of the waste would accordingly be greatly decreased.

FIG. 1 of British Patent Specification No. 1,019,099 to Snia Viscosa, hereby incorporated by reference, describes apparatus (a rotary dryer) similar to that used in practicing the method of the present invention. U.S. Pat. Nos. 3,870,475 and 3,787,481, both to Siclari et al., and 3,296,709 to Barsch, all of which are hereby incorporated by reference, also describe apparatus that have potential use for practicing the method of the present invention, specifically a vertical wall evaporator with a high speed rotor and a rotating drum chip dryer, respectively.

SUMMARY OF THE INVENTION

The present invention provides a method for separating a liquid mixture into its aqueous and non-aqueous liquid phases. The method comprises the steps of introducing the liquid mixture into a gas-tight vessel, preferably via a spray nozzle which discharges jets of the liquid mixture onto the inside surface of the vessel; rotating the vessel at a surface speed of approximately 19 to 190 ft/min (0.095 to 0.950 m/s) to cause filming of the liquid composition, while simultaneously heating the vessel, preferably to a temperature of about 90° to 92° C., to cause the aqueous phase to evaporate; removing the water vapor under vacuum, preferably under vacuum of 203 to 508 torr; and condensing the water vapor for removal. It is preferred that the liquid mixture be a finish composition diluted with water and having a viscosity of 2 to 115 centipoise (cps). It is also preferred that the liquid mixture be filtered with a 40 to 100, preferably the latter, micron filter prior to being introduced into the vessel.

In the most preferred embodiment the present invention provides a method for separating the aqueous and non-aqueous phases of a finish composition diluted with water and having a viscosity of 2 to 115 cps. The method comprises the steps of filtering the diluted finish composition with a 40 to 100 micron filter; injecting the diluted finish composition into a gas-tight vessel via a spray nozzle which discharges jets of the composition onto the inside surface of the vessel; rotating the vessel at a surface speed of approximately 19 to 190 ft/min (0.095 to 0.950 m/s) to cause filming of the composition, while simultaneously heating the vessel to a temperature of about 90° to 92° C. to cause the aqueous phase to evaporate; removing the water vapor under vacuum of 203 to 508 torr; and condensing the water vapor for removal.

The invention will be more clearly understood and additional objects and advantages will become apparent upon reference to the discussion below and to the drawings which are given for illustrative purposes.

DETAILED DESCRIPTION OF THE INVENTION

Figure 1:
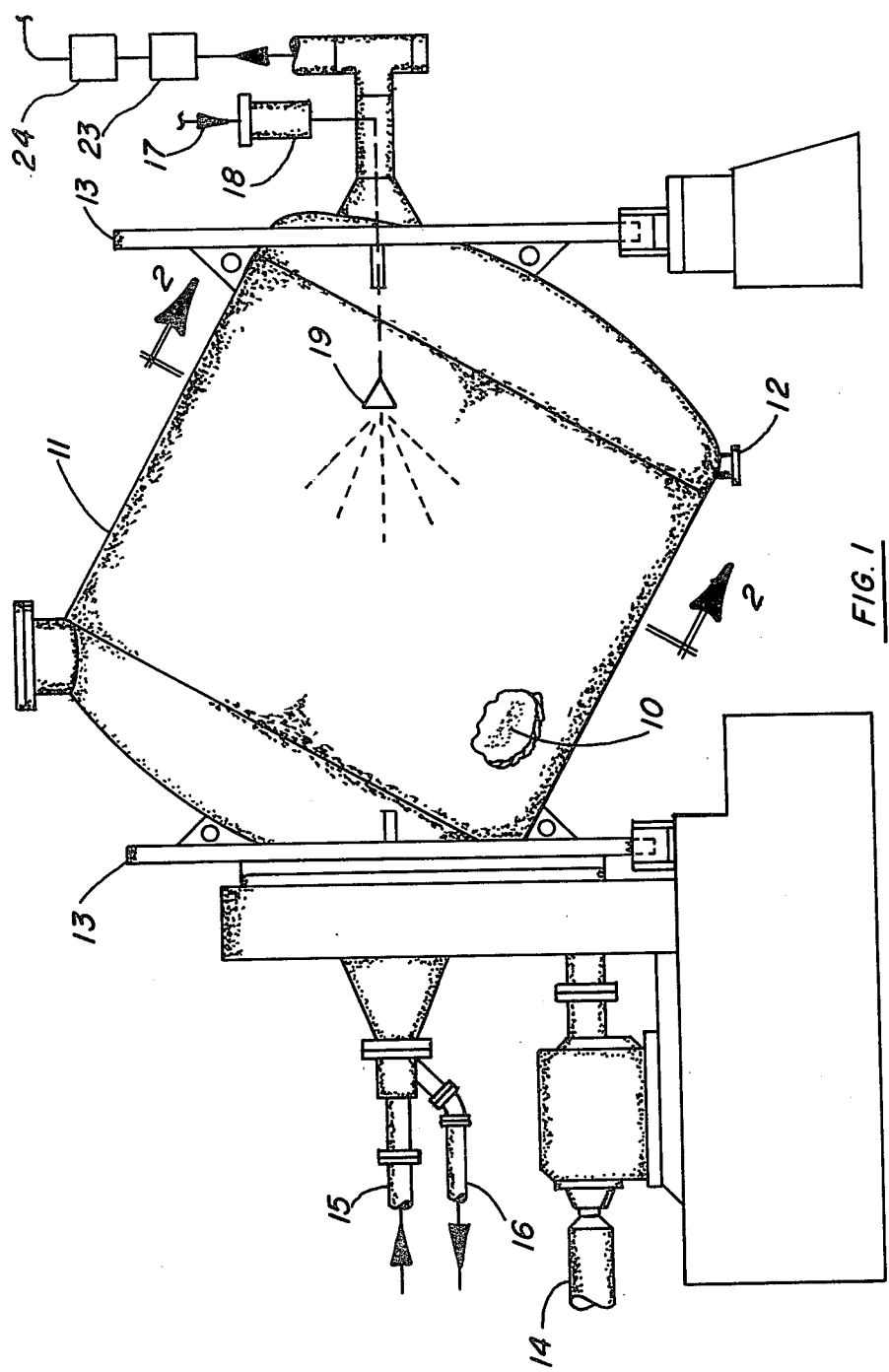
FIG. 1 is a schematic view of apparatus for practicing the present invention.
Figure 2:
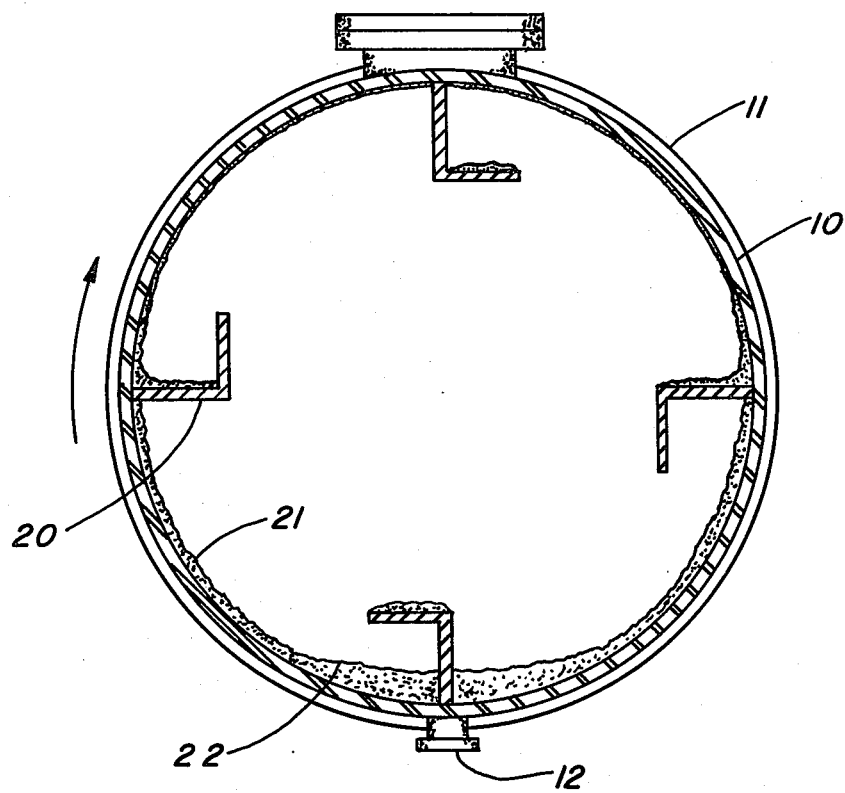
FIG. 2 is a cross-section taken on lines 2—2 of FIG. 1.

With reference to the accompanying drawings, like numbers indicate like apparatus. With reference to FIG. 1, a gas-tight vessel 10 is held eccentrically at two diametrically opposed ends by tires 13 that run on trunnion rolls (unshown) and are driven for rotation of vessel 10 by conventional motor 14. Vessel 10 is preferably about 6 ft (1.8 m) in diameter and 8 ft (2.4 m) in length, and is rotated at a speed of 1 to 10 revolutions per minute, perferably 3 revolutions per minute, to give a surface speed of about 19 to 190 ft/min (0.095 to 0.950 m/s). Steam inlet 15 and steam condensate outlet 16 connect through a rotary steam joint to the volume between vessel 10 and jacket 11. With reference to FIG. 2, dimpled jacket flights 20 are connected in a conventional manner with the volume between vessel 10 and jacket 11. In this manner, vessel 10 and angled flights 20 are heated. It is preferred that a sufficient amount of heat be supplied to bring vessel 10 to a temperature of about 90° to 92° C.

In FIG. 1, heat traced feed line 17 feeds water diluted finish composition having a Brookfield viscosity at 25° C. of about 2.8 to 2.9 cps through a conventional bag filter 18 having a mesh size, preferably, of 40 to 100 microns. The composition is then pumped continuously by a Milton Roy Diaphragm metering pump (not shown) at a flow rate of up to 2.5 gal/min (0.0002 m³/s) through a pipe connection in a rotary joint to injection nozzle 19, which discharges jets of the composition onto the heated inner surface of vessel 10 and angled flights 20 attached thereto (see FIG. 2). Heated flights 20 function in conjunction with the rotation of vessel 10 to cause filming of the composition for more rapid evaporation of the aqueous phase. With reference to FIG. 2, numeral 21 represents a film of the composition and numeral 22 represents the accumulating pool of the composition, which with time becomes concentrated with the non-aqueous phase.

The water vapors are removed from vessel 10 by a vacuum generating device 24 at the end of the process.

Vacuum generating device 24 may be a conventional vacuum jet or vacuum pump, preferably the latter, under pressure of 203 to 508 torr, most preferably 304 torr. The water vapors are removed through the introductory rotary joint through condenser system 23, which comprises two conventional condensers cooled by chilled water and operating in parallel with a condensing capacity of approximately 2.4 gal/min (0.0002 m³/s). The remaining vapors are combined and moved through a third condenser where an additional condensate flow of approximately 0.1 gal/min (b 0.0000003 m³/s) combines with the flow from the first two condensers. All three of these condensers have a level control in the tank section which will open drain valves and start condensate pumps to transfer the water condensate to a contaminated drain. Vacuum generating device 24 draws all remaining vapors from the third condenser and exhausts them through a scrubber designed to remove vacuum pump oil vapors from the remaining water vapors. These remaining water vapors are exhausted to the atmosphere. The minute amounts of vacuum pump oil carryover that are removed by the scrubber are returned to a contaminated drain. The concentrated non-aqueous phase of the composition that collects as pool 22 in vessel 10 is periodically removed by stopping rotation of vessel 10, connecting a flexible hose to drain 12, opening a valve (unshown) to complete a flow path from vessel 10 through the hose into a receiver tank (unshown) with a vent to the atmosphere. This arrangement allows relief of the vacuum on vessel 10 (a valve in the vapor line to the condensers is closed prior to connecting the drain hose). The concentrated non-aqueous phase may be stored for subsequent removal and shipping according to established procedures. At the time of discharge from vessel 10, the concentrated non-aqueous phase has a Brookfield viscosity at 25° C. of approximately 115 cps.

It is preferred that feed of the diluted finish composition to rotating heated vessel 10 continue uninterrupted for twenty-three hours, followed by a one hour period without feed. Rotation of the vessel 10 is stopped and the concentrated non-aqueous phase is removed via drain 12. Thereafter, the equipment may be restarted.

I claim:

1. A method for separating a liquid waste finish composition of up to 99 percent water and having a viscosity of about 2 to 115 centipoise into its aqueous and non-aqueous liquid phases, comprising:
   a. introducing the liquid composition into a gas-tight vessel;
   b. rotating the vessel at a surface speed of approximately 19 to 190 ft/min (0.095 to 0.950 m/s) to cause filming of the liquid composition, while simultaneously
   c. heating the vessel to cause the aqueous phase to evaporate;
   d. removing the water vapor under vacuum;
   e. condensing the water vapor for removal; and
   f. recovering a waste finish composition concentrate of sufficient concentration so as to otherwise substantially reduce the costs of transportation and disposal thereof.

2. The method of claim 1 wherein the liquid composition is filtered with a 40 to 100 micron filter prior to being introduced into the vessel.

3. The method of claim 1 wherein the liquid composition is introduced into the vessel via a spray nozzle which discharges jets of the liquid composition onto the inside surface of the vessel.

4. The method of claim 1 wherein the vessel is heated to a temperature of about 90° to 92° C. to cause the aqueous phase to evaporate.

5. The method of claim 1 wherein the water vapor is removed under vacuum of 203 to 508 torr.

6. A method for separating the aqueous and non-aqueous phases of a waste finish composition of up to 99 percent water and having a viscosity of 2 to 115 centipoise, comprising:
   a. filtering the finish composition with a 40 to 100 micron filter;
   b. injecting the finish composition into a gas-tight vessel via a spray nozzle which discharges jets of the composition onto the inside surface of the vessel;
   c. rotating the vessel at a surface speed of approximately 19 to 190 ft/min (0.095 to 0.950 m/s) to cause filming of the composition, while simultaneously
   d. heating the vessel to a temperature of about 90° to 92° C. to cause the aqueous phase to evaporate;
   e. removing the water vapor under vacuum of 203 to 508 torr;
   f. condensing the water vapor for removal; and
   g. recovering a waste finish composition concentrate of sufficient concentration so as to otherwise substantially reduce the costs of transportation and disposal thereof.

* * * * *